United States Patent Office 3,156,176
Patented Nov. 10, 1964

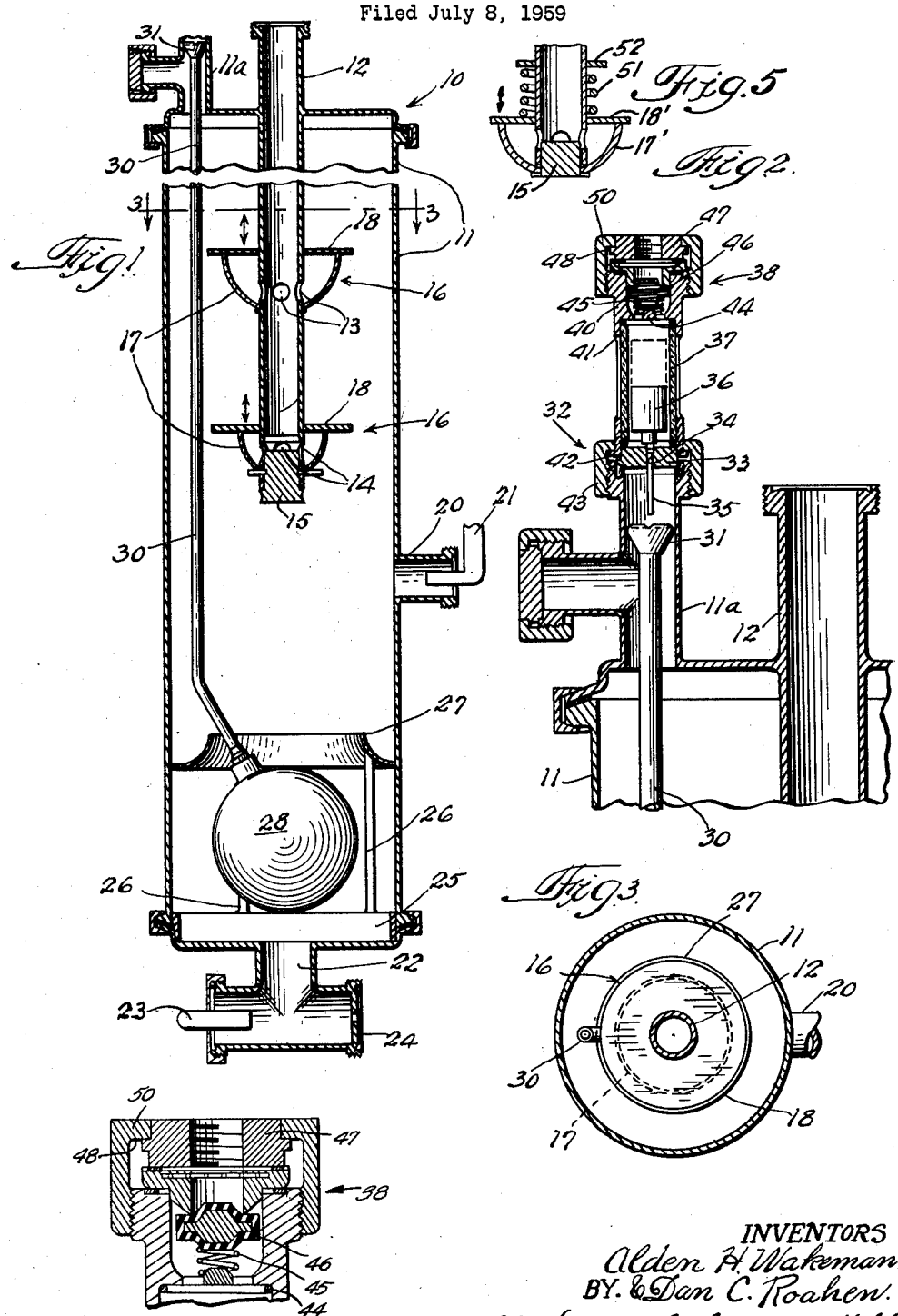

3,156,176
HEATING APPARATUS
Alden H. Wakeman, Lake Mills, and Dan C. Roahen, Fort Atkinson, Wis., assignors, by mesne assignments, to St. Regis Paper Company, New York, N.Y., a corporation of New York
Filed July 8, 1959, Ser. No. 825,787
5 Claims. (Cl. 99—251)

This invention relates to a heating apparatus and more particularly to an apparatus for heating a liquid product to a predetermined high temperature by utilizing steam, preferably saturated, as the heating medium.

In the dairy processing field, for example, various apparatus of this type have heretofore been proposed for the accomplishment of what is known in the industry as high or ultra-high temperature short-time pasteurization or sterilization of milk. Because of the design of such apparatus and the delicate nature of the product being treated, these apparatus have been beset with one or more of the following shortcomings: (a) poor control of the holding time for obtaining pasteurization or sterilization of the product results by reason of steam becoming entrained in the treated product leaving the heating apparatus; (b) the efficiency of operation of such apparatus is low because of the excessive amount of steam required to attain the desired high temperature of the product; (c) because of the hazards associated with the handling of a large quantity of high temperature steam, such apparatus is normally of a costly and complex construction, requiring numerous safety controls; (d) where an excessive amount of steam is utilized, the problem of removing a large amount of steam vapors and condensate from the treated product becomes a problem in and of itself, requiring the inclusion of numerous additional steps in the treatment of the product; (e) the employment of the high temperature steam oftentimes produces a scorched or cooked flavor in the product; (f) extensive protein destabilization frequently occurs in the product due to the concussive impact caused by the entering steam; and (g) the apparatus is frequently of a bulky construction and not readily capable of being cleaned in place, so as to comply with strict public health laws and ordinances.

Thus, it is one of the objects of this invention to provide a heating apparatus which is not possessed of the aforementioned shortcomings.

It is a further object of this invention to provide a heating apparatus which is capable of heating a liquid product entering at a relatively low temperature to a relatively high temperature and yet maintaining a very small temperature differential between the treated product and the steam utilized as the heating medium.

It is a further object of this invention to provide an apparatus whereby no steam utilized as the heating medium becomes entrained as noncondensed steam in the treated product and thus very accurate holding time for the treated product at a predetermined temperature can be readily determined.

It is a further object of this invention to provide a heating apparatus which is capable of heating a wide variety of liquid products.

It is a still further object of this invention to provide a heating apparatus whereby the pressure of the entering steam is relatively low.

Further and additional objects will appear from the description, accompanying drawing and appended claims.

In accordance with one embodiment of this invention, an apparatus is provided which comprises an elongated upright chamber in which there is provided at the upper end thereof an inlet for the liquid product to be treated. Cooperating with a portion of the inlet, which projects into the interior of the chamber, is a means for effecting diffusion of the incoming product toward the interior of the chamber whereby a substantial curtain of the product descends within the chamber. Mounted on the upright side surface of the chamber, beneath the liquid-diffusing means and spaced a substantial distance above the bottom of the chamber, is a second inlet through which steam, preferably saturated, enters the chamber interior in a direction substantially normal to the vertical axis of the chamber. The velocity of the entering steam is such that it penetrates the descending product curtain and becomes admixed therewith, so that an effective heat transfer between the steam and product results. An outlet for the admixture of the product and steam condensate is provided at the bottom of the chamber. A valve cooperates with the outlet for regulating the flow of the admixture through the outlet, so as to insure that a column of the admixture of the product and steam condensate will be formed in the chamber between the steam inlet and outlet and, in addition, to maintain the chamber interior at a predetermined pressure. Disposed within the chamber interior is a control means for regulating the amount of admixture which can accumulate within the lower portion of the chamber.

For a more complete understanding of this invention, reference should be made to the drawing, wherein:

FIGURE 1 is a fragmentary vertical sectional view of the improved apparatus;

FIG. 2 is an enlarged fragmentary vertical sectional view of a portion of the improved apparatus;

FIG. 3 is a sectional view taken along line 3—3 of FIG. 1;

FIG. 4 is an enlarged fragmentary vertical sectional view of the valve assembly shown in FIG. 2; and FIG. 5 is an enlarged fragmentary vertical section view of an alternative construction of lower baffle assembly 16' shown in FIG. 1.

Referring now to the drawing and more particularly to FIG. 1, an improved apparatus 10 for heating a liquid product with steam, preferably saturated, as the heating medium, is shown. The embodiment illustrated is of a type suitable for use in a commercial dairy plant for pasteurizing or sterilizing milk. It is to be understood, of course, that the invention is not to be limited to an apparatus of this precise character. The application of the improved apparatus to the dairy processing field, to be hereinafter described, is merely by way of example, for the purpose of facilitating understanding of the invention.

The apparatus 10, in this instance, includes an elongated cylindrically-shaped chamber 11 which is mounted on a suitable frame, not shown, in an upright position. Mounted on the upper end of the chamber 11, and in substantially coaxial relation with respect to the longitudinal axis of the chamber 11, is an inlet 12 which is in the form of a tubular element, the upper end of which is exposed and is connected to a pump, not shown, for the milk supply. A substantial portion of the tubular element projects into the chamber interior, as seen in FIG. 1. The lower portion of the element is provided with sets of apertures 13 and 14, each set being longitudinally spaced with respect to one another and comprising a plurality of symmetrically arranged apertures. The centers of the apertures of a set are disposed in plane substantially normal to the axis of the inlet 12. The lower end of the inlet tubular element is closed off by a plug 15. It will be noted that the inserted end of the plug 15 may partially close off apertures of set 14. The purpose of this arrangement is to insure that there is substantially uniform flow of the product out through both sets of apertures and to compensate, in part at least, for the increased head pressure existing on the lower set of apertures 14, due to the longitudinal spacing between the sets.

Cooperating with each set of apertures is a baffle assembly 16 or 16'. The assembly for each set is of like construction and comprises a cup-shaped first baffle 17 or 17', the lower end of which snugly encompasses the periphery of the inlet tubular element 12 beneath the corresponding set of apertures. Baffle 17 or 17' flares outwardly and upwardly from the tubular member and terminates above the set of apertures in question. The function of the baffle 17 or 17' is to deflect upwardly the product flowing out through the apertures. Assembly 16 or 16' also includes a second annularly-shaped baffle 18 or 18' which is adapted to normally rest upon the upper edge of baffle 17 or 17'. Baffle 18 or 18', however, is free to move longitudinally upwardly on the inlet tubular element away from baffle 17 or 17'. The extent to which baffle 18 or 18' will move will depend upon the velocity of the deflected flowing product which impinges upon the underside of the baffle. Because of the flat underside of the baffle, the flowing product will be deflected outwardly in a radial direction and impinge upon the interior surface of the chamber 11 and descend along such surface in the form of a substantial curtain. The size of the interior surface of the chamber and its relation with the inlet tube and its deflector assemblies should be such that the effect on flow of the product through the apparatus is to discharge the product in a curtain-like spray of sufficient extent that the product flows down the wall of the chamber wherein it will become intimately mixed with the entering steam.

As a further means of compensating for the increased head pressure of the product on the lower set of apertures 14, the baffle 18' of the assembly 16' cooperating with this set of apertures is of greater weight than the other baffle 18. Thus, the discharge of product outwardly from each assembly 16 or 16' is substantially the same. Instead of different weight plates, added load could be applied by means of springs or other means of compensation to offset the effect of the differences in static head. Such an alternative construction is illustrated in FIG. 5, which shows a lower baffle assembly 16'. Such assembly in this instance includes a coil spring 51 which envelops the tubular member. The spring has the upper end thereof engaging a collar 52 held in a fixed position on the outer surface of the tubular member. The lower end of the spring resiliently engages a baffle 18' and urges the latter into engagement with the upper edge of baffle 17'. The spring force exerted upon baffle 17' is equal to the difference between the upward force exerted by the flowing product on the under side of baffle 18' and the upward force exerted on the under side of the upper baffle 18. Thus the spring force compensates for the differences in static head.

Mounted on the vertical side of chamber 11, and beneath the lower end of inlet tubular element, is a second inlet 20 which comprises a pipe section projecting outwardly from the chamber periphery. The pipe section is connected to a suitable source of steam, preferably saturated, not shown. Mounted within the pipe section is a thermometer 21, shown diagrammatically in FIG. 1. The thermometer accurately registers the temperature of the incoming steam. The velocity of the entering steam is such that it penetrates the descending curtain of the product and effectively intermixes with the product whereby all of the entering steam condenses. The fact that all of the entering steam condenses and no steam becomes entrained in the discharge of the admixture of the steam condensate and product from the chamber is extremely important, and will be described in greater detail hereinafter.

Formed in the bottom of chamber 11 is an outlet 22, through which the admixture of the steam condensate and liquid product is discharged from the chamber. The outlet 22, in this instance, is in the form of a T connection. One segment of the connection is closed off and has disposed therein a thermometer 23, which is diagrammatically shown and accurately indicates the temperature of the admixture being discharged. A second segment of the outlet T connection communicates with a pipe section, not shown, leading to another piece of equipment, not shown, utilized in the treatment of the product. For example, in a dairy plant such equipment might be a holding tube.

Disposed within this second segment is a flow control apparatus, such as a restricter valve or restricted orifice 24, the latter being shown in FIG. 1, which serves a most important function, namely, to maintain the pressure within the chamber above the corresponding boiling point of the liquid product being treated. Thus, by maintaining this condition within the chamber, there will be complete condensing of the steam with the product and no uncondensed steam will become entrained in the discharged admixture. The importance of this latter condition of the discharged admixture, particularly in the dairy processing field, is that an accurate determination of the time that the admixture will be held in the holding tube, not shown, at a predetermined temperature, can be made. This feature of the improved apparatus is clearly lacking in the prior art construction.

The added function of the flow control apparatus 24 is that it restricts the discharge of admixture to such an extent that there will always be an accumulation of the admixture within the lower portion of the chamber. Thus, there will always be a column of the admixture between the steam inlet 20 and the outlet 22, thus preventing uncondensed steam from escaping through outlet 22.

Resting upon the bottom of chamber 11 is an antivortexing element 25, which may be one of many different configurations suitable for performing its desired function. Symmetrically arranged about the outer periphery of element 25 and projecting upwardly therefrom are a plurality of post-like members 26. The upper ends of members 26 are secured to the underside of ring-like baffle 27. The outer periphery of baffle 27 flares outwardly and downwardly and terminates adjacent the interior surface of the chamber. The function of the baffle 27 is to deflect the flow of the descending admixture of steam condensate and product prior to its accumulation in the bottom of the chamber and thereby cause the elimination of any gas which might have become entrained in the descending admixture.

As shown in FIG. 1, there is also disposed within the lower portion of chamber 11 a float 28, the function of which will be described more fully hereinafter. The float 28 is positioned between the post-like members 26 and the latter serve as guides for the float as it rises and falls within the chamber in accordance with the change in the level of the accumulated admixture. Extending generally upwardly from the periphery of the float, and affixed thereto so as to move therewith, is an elongated rod 30. The upper end of the rod terminates within a tubular extension 11a formed on the upper surface of the chamber and communicating with the interior of the chamber. Affixed to the upper end of rod 30 is an enlarged head 31 (see FIG. 2). The head size is such that it is free to move up and down within extension 11a as rod 30 is moved by float 28.

Mounted on the upper end of extension 11a is a valve assembly 32, which includes a valve seat piece 33 which overlies the upper end of the extension 11a. Piece 33 is provided with a central opening 34 through which extends the elongated stem 35 of valve head 36. The lower end of stem 35 is adapted to be engaged by head 31 of rod 30. Valve head 36 is adapted to float within a cavity defined by a cylindrical piece 37 of transparent material. The outer surface of piece 37 may be provided with suitable calibrations so that an operator may readily observe when valve head 36 is unseated with respect to seat piece 33. When the valve head 36 is unseated, it is an non-condensable gas communicating with the interior of said chamber, adjustable valve means operatively connected to said third inlet, valve adjusting means associated with said chamber and responsive to the accumulation of the admixture therein to adjust said valve means to permit introduction of the non-condensible gas into said chamber to effect an increase in pressure within said chamber, said adjustment occurring only when the accumulation of said admixture within said chamber reaches a predetermined level, and restricting means mounted within said outlet for maintaining within said chamber a predetermined pressure above the boiling point of the diffused liquid and to effect an accumulation of a predetermined amount of the admixture within the lower portion of the chamber.

3. The apparatus recited in claim 2, wherein the liquid inlet includes an elongated tubular member projecting axially into said chamber and closed at its lower end, said tubular member being provided with a peripheral aperture, and said means cooperating with said inlet including a first baffle element affixed to the periphery of said tubular member beneath said aperature; said first baffle element extending outwardly and upwardly from said tubular member periphery, and a second baffle element encompassing said tubular member and being longitudinally adjustable with respect thereto, said second element being adapted to normally rest upon the upper portion of said first element, the longitudinal adjustment of said second element being dependent upon the velocity of the liquid flowing through said tubular member and impinging upon the underside of said second element.

4. The apparatus recited in claim 2, wherein the liquid inlet includes an elongated tubular member projecting axially into said chamber and closed at its lower end, said tubular member being provided with a plurality of longitudinally spaced sets of apertures, the apertures of a set being symmetrically arranged about the periphery of said tubular member, and said means cooperating with said inlet including a plurality of first baffle elements, one for each set of apertures, each first baffle element being affixed to said tubular member beneath the corresponding set of apertures and extending outwardly and upwardly therefrom, and a plurality of second annularly-shaped baffle elements encompassing said tubular member, one for each set of apertures, each second baffle element being longitudinally adjustable on said tubular member and adapted to normally rest upon the upper portion of the corresponding first baffle element, the longitudinal adjustment of each second baffle element being dependent upon the velocity of the liquid flowing through said tubular member and impinging upon the underside of said second element.

5. The apparatus recited in claim 4, wherein the second baffle elements, commencing from the lowermost one thereof, become progressively lighter in weight for each successive second baffle element.

References Cited in the file of this patent

UNITED STATES PATENTS

| | | |
|---|---|---|
| 1,468,420 | Stearas et al. | Sept. 18, 1923 |
| 2,019,491 | Grindrod | Nov. 5, 1935 |
| 2,020,309 | Grindrod | Nov. 12, 1935 |
| 2,077,227 | De Bethune | Apr. 13, 1937 |
| 2,122,954 | Rogers | July 5, 1938 |
| 2,401,077 | Johnston | May 28, 1946 |
| 2,499,243 | Franklin | Feb. 28, 1950 |
| 2,536,115 | Wilbur | Jan. 2, 1951 |
| 2,572,527 | Sebald | Oct. 23, 1951 |
| 2,665,628 | Boileau et al. | Jan. 12, 1954 |
| 2,830,911 | Fogelberg | Apr. 15, 1958 |

FOREIGN PATENTS

| | | |
|---|---|---|
| 11,713 | Great Britain | of 1912 | indication that excessive admixture has accumulated within the chamber.

Secured to the upper end of cylindrical piece 37 is a second valve assembly 38, see FIGS. 2 and 4, which includes a sleeve or cage 40 which encompasses the outer surface of piece 37. Sleeve 40 is provided with a plurality of elongated slots 41 so as to enable the calibrations on piece 37 to be seen. The lower end of sleeve 40 is provided with a shoulder 42 which is engaged by a clamping collar or nut 43, the latter being threaded onto the upper end of extension 11a.

At the upper end of sleeve 40 is a perforated transverse wall 44 on which is supported the lower end of a coil spring 45. The upper end of spring 45 resiliently engages the underside of a valve plug 46. The plug 46, which is in function merely a check valve, is urged by spring 45 into abutting closing relation with the lower open end of a connector piece 47. A shoulder 48 is formed on the outer surface of piece 47 and is engaged by a clamping collar or nut 50. Collar 50 is threaded onto the upper end of sleeve 40. Connector piece 47 serves as a connector to a source of noncondensable gas, not shown, which is maintained at a higher pressure than the interior pressure of the chamber. Thus, extension 11a might be called more appropriately an inlet for a non-condensable gas. The effect of the introduction of such gas into the interior of the chamber is to increase slightly the pressure therein to prevent an undesirably high level of admixture accumulation and thus maintain substantially a uniform flow through outlet 22.

The design of the product-diffusing assemblies 16 and 16' is such that the curtain of the descending product acts to separate the chamber interior, above the accumulated admixture into a section containing a high concentration of noncondensable gas which is disposed above a steam infusion section. When the accumulated admixture goes below a predetermined level, the valve head 36 will automatically seat itself on piece 33, thus shutting off the non-condensable gas supply and effecting a pressure drop of sufficient magnitude within the chamber to permit the accumulated admixture level to rise.

Extension 11a is provided with a transversely extending portion, not shown, which may be utilized as a connection for other well known types of controls, not shown, but which are suitable in serving the same function as that attained by the float-actuated mechanism previously described.

In a typical operation of the improved apparatus 10, the capacity thereof might be 15,000 pounds of milk per hour. The milk in such a case would enter the chamber at 125° F. The steam at the same time would enter the chamber under control at 270° F. and at a pressure of 27 p.s.i.g. Under such conditions, the temperature of the admixture leaving the chamber would be 265° F. An important fact is to be noted from these results and that is that a temperature differential of only 5° F. exists between the entering steam and the discharged admixture and thus indicates the highly efficient heat-exchange which occurs between the product and steam.

A suitable source of noncondensable gas, such as nitrogen, is connected to the chamber at connector piece 47 for maintaining a predetermined pressure within the chamber (i.e., 27 p.s.i.g.) and thus effect a uniform flow through the outlet 22 and prevent excessive accumulation of the product and condensate in the chamber.

It is noted that the improved apparatus may be operated by conventional means substituted in place of the illustrated valve assembly 32.

It is also to be noted that in the improved apparatus 10 there is no deleterious effect on the product, due to the impact of the steam impinging directly onto the descending product. The elimination of the so-called "concussive impact" on the product in the improved apparatus is due to the large volume of the chamber into which the steam is introduced, as compared to the quantity or volume of the descending product, whereby the product particles are free to yield or deflect from their course of descent and thus cause much of the force of the entering steam to be expended without adversely affecting the product particles.

As heretofore mentioned, the improved apparatus has heretofore been described in relation to a dairy plant operation; however, this was done by way of illustration, to facilitate understanding of the invention. It will be recognized that the apparatus is suitable for heating liquid products other than milk, in which case other types of product-diffusing means (assemblies 16 and 16'), product-control valve (restrictive orifice 24) and accumulated admixture control means (float 28 and valves 32 and 38) may be incorporated. In any event, the pressure within the chamber 11 should remain above the corresponding boiling point of the product being treated, so as to insure that all of the entering steam will condense within the chamber.

Thus, it will be seen that a simple, highly efficient heating apparatus has been provided which does not deleteriously affect the product being treated and enables the desired temperature of the discharged admixture of the steam condensate and product to be accurately controlled.

While several embodiments of this invention are shown above, it will be understood, of course, that the invention is not to be limited thereto, since many modifications may be made and it is contemplated, therefore, by the appended claims, to cover any such modifications as fall within the true spirit and scope of this invention.

We claim:

1. An apparatus for heat treating a flowing liquid, comprising an elongated upright chamber, a first inlet for such liquid disposed adjacent to the upper end of said chamber, means operatively connected to said first inlet to effect spray-like diffusion of the entering liquid toward the interior surface of said chamber whereby a substantial curtain of liquid descends within said chamber, a second inlet for steam mounted on said chamber beneath said liquid diffusing means for introducing steam into said chamber in a direction substantially normal to said chamber longitudinal axis whereby all the steam introduced into said chamber penetrates the liquid curtain and intimately mixes and is in heat exchange with the descending liquid so that all of the steam condenses, an outlet for the admixture disposed adjacent to the chamber bottom, a third inlet for pressurized non-condensable gas communicating with the interior of said chamber, adjustable pressure maintenance means operatively connected to the interior of said chamber for maintaining the interior pressure of said chamber through said third inlet, and restricting means mounted within said outlet for controlling the flow of admixture through said outlet and effect an accumulation of admixture within said chamber whereby said outlet is submerged therein and the pressure within the said chamber remains above the boiling point of the entering liquid.

2. An apparatus for heat treating a flowing liquid comprising an elongated upright chamber, a first inlet for such liquid disposed adjacent to the upper end of said chamber and depending therefrom in a direction substantially coaxial with the longitudinal axis of said chamber, means operatively connected to said first inlet to effect diffusion of such liquid in a direction substantially radially outwardly toward the interior surface of said chamber whereby a substantial curtain of liquid descends within said chamber, a second inlet for steam mounted on said chamber beneath said liquid diffusing means for introducing steam into said chamber in a direction substantially normal to said chamber longitudinal axis and penetrating such liquid curtain to effect intermixing and heat exchange of the steam with the descending liquid whereby all of such steam is condensed, an outlet for the admixture of steam condensate and liquid adjacent the bottom of said chamber, a third inlet for pressurized